United States Patent [19]

Fujita

[11] 3,864,957

[45] Feb. 11, 1975

[54] METHOD AND APPARATUS FOR MEASURING THE TIMING OF QUARTZ CRYSTAL TIMEPIECES

[75] Inventor: Kinji Fujita, Shimosuwa-machi, Japan

[73] Assignee: Kabushiki Kaisha Suwa Seikosha, Tokyo, Japan

[22] Filed: Feb. 9, 1972

[21] Appl. No.: 224,722

[30] Foreign Application Priority Data
Feb. 10, 1971  Japan.................................. 46-5218

[52] U.S. Cl. ............................................. 73/6
[51] Int. Cl. .......................................... G04d 7/12
[58] Field of Search ............ 73/6, 67, 67.2, 69, 71.4

[56] References Cited
UNITED STATES PATENTS
2,377,349   6/1945   MacKenzie ......................... 73/71.4
3,238,764   3/1966   Greiner...................................... 73/6
3,345,862  10/1967   Rowe ................................. 324/78 D
3,370,456   2/1968   Jucker ...................................... 73/6
3,540,207  11/1970   Keeler..................................... 58/25

Primary Examiner—S. Clement Swisher
Attorney, Agent, or Firm—Waters, Roditi, Schwartz & Nissen

[57] ABSTRACT

For measuring the timing of quartz crystal timepieces there is provided a microphone pickup which is adapted to pick up vibrations from the casing of the timepiece and to convert these mechanical vibrations into an electronic or electrical signal which is amplified and fed to a crystal filter, the filtered signal then being further amplified and supplied to a counter. This enables the vibrations generated within the casing by a quartz crystal to be measured and the accuracy of the timepiece to be checked.

2 Claims, 2 Drawing Figures

METHOD AND APPARATUS FOR MEASURING THE TIMING OF QUARTZ CRYSTAL TIMEPIECES

FIELD OF THE INVENTION

The present invention relates to quartz crystal timepieces of the type which use crystal vibrators as time standards, and more particularly to methods and apparatus for measuring the accuracy of quartz crystal timepieces.

BACKGROUND OF THE INVENTION

Crystal vibrators have a very high stability with respect to frequency and highly accurate timepieces can be provided by the use of such devices. Specifically, it is known that the highly stabilized oscillating frequency generated by a crystal vibrator can be divided into a low frequency by an electronic circuit with associated hands being advanced by a driving motor, and it is also widely known that a crystal vibrator can be used when extreme accuracy is required such as in table clocks and other such timepieces.

Recently, the miniaturization of such vibrators and the associated electronic circuits has made it possible to make quartz crystal wrist watches with mass-production techniques. In connection therewith, it is required to measure the timing in the timepieces thusly produced. In such wrist watches, it is usually desirable that tests relating to temperature, shock-resistance and accuracy and so forth be performed within the casing. However, in order to measure the timing with extreme accuracy, it is desirable to measure the frequency of the crystal vibrator by using an electronic counter which makes it necessary to lead out signals to a measuring terminal. This is, however, disadvantageous because of the measurement from the outside of the casing which encompasses the movement and because of the water tightness provisions of the watch casing. Accordingly, a technique providing for the highly accurate measurement of timing from outside of the casing is desirable.

SUMMARY OF THE INVENTION

An object of the present invention is to provide a simple and highly accurate method and apparatus for measuring the accuracy of a quartz crystal wrist watch from the outside of the casing encompassing the movement of such watch.

To achieve the above and other objects of the invention, there is provided an apparatus to use with a timepiece including a casing in which is located a quartz crystal which vibrates at least proximate a fixed frequency. The apparatus includes transducer means to pick up the vibrations of the crystal through the casing and convert the same into an electrical signal of corresponding frequency. An electronic circuit is coupled to the transducer means to measure the frequency of the quartz crystal.

In accordance with a feature of the invention, the aforesaid electronic circuit may include filter means for filtering through only those frequencies originating with the quartz crystal.

According to another feature of the invention, a counter may be coupled to the above mentioned filter means.

According to yet another feature of the invention, the aforementioned filter means may include at least one and preferably two quartz filters.

In further accordance with the invention, a preamplifier may be employed to couple the transducer means to the filter means and an amplifier may also be employed which couples the filter means to the above mentioned counter.

In accordance with a preferred feature of the invention, the transducer means may be in the form of a highly sensitive microphone.

The method of the invention is provided for measuring the frequency of an electronic timepiece including a casing supporting a quartz crystal which vibrates. This method may particularly comprise picking up the vibrations of the crystal through the casing and converting the vibrations into an electrical signal, the frequency of which is measured.

With respect to the method of the invention, the afore-noted vibrations may be either mechanical or acoustical.

BRIEF DESCRIPTION OF DRAWING

The invention will be more readily understood by reference to the accompanying drawing in which.

DETAILED DESCRIPTION

As is known with respect to quartz crystal timepieces, a piece of quartz is generally supported by a supporting wire and driven by a driving voltage supplied via the supporting wire. Some of the resultant vibrating energy is changed into mechanical vibrating energy and leaks via this supporting wire as a loss of the energy to the outside. This mechanical vibrating energy includes or is constituted by the vibrating energy of the piece of quartz.

In accordance with this invention, a small amount of mechanical vibrating energy is picked up and the frequency of the crystal vibrator is measured and thus the accuracy of the associated watch can be examined. More specifically, the frequency is measured by an electronic counter and by contacting the casing of the quartz crystal wrist watch with a sensitive microphone, by filtering the resulting signal which is amplified by a pre-amplifier and by picking up only the frequency of the crystal vibrator.

As mentioned above, by using the method of this invention, the accuracy of a quartz crystal wrist watch can be measured without leading out a connection to a measuring terminal and by merely contacting the casing of a watch with a microphone. Therefore, when quartz crystal wrist watches are mass-produced, the working efficiency in measuring the accuracy of the same will be suitable. Additionally, the invention can be applied to large-sized quartz crystal timepieces wherein it is difficult to lead out connections to measuring terminals from the casing. In this invention, an electronic counter is generally used for measuring frequency. However, a digital-to-analogue converter may alternatively be employed.

Figure 1:
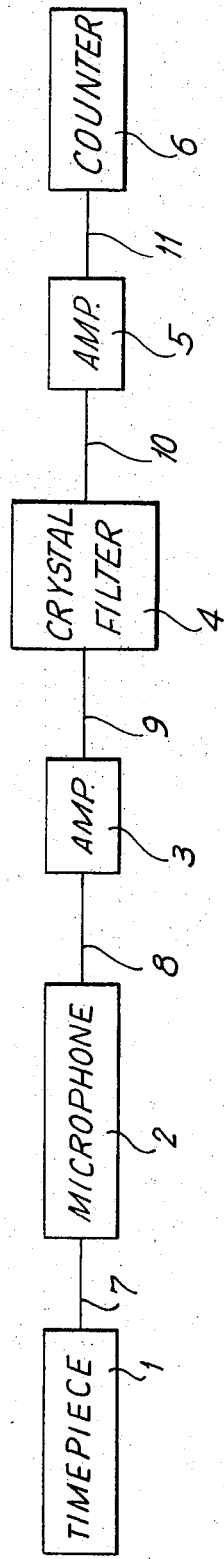
FIG. 1 is a block diagram illustrating one embodiment of the invention.

In FIG. 1 appears a block diagram of one embodiment of the invention, according to which the apparatus includes a timepiece 1, a microphone 2, a preamplifier 3, a quartz crystal filter 4, an amplifier 5, and an electronic counter 6 which may alternatively be a digital-to-analogue converter.

The microphone 2 is in a sense mechanically linked to the timepiece 1 as indicated at 7, this being representative of the fact that the microphone 2 mechanically engages the casing of the timepiece 1 in which is located and supported a quartz crystal which generates vibrations at a relatively fixed frequency according to known techniques.

The microphone 2 operates as a transducer and converts the mechanical or acoustical vibrations to an electrical signal of corresponding frequency, this electrical signal being transmitted to the pre-amplifier 3 via a line 8.

Amplifier 3 transmits the amplified and selected signal via line 9 to crystal filter 4, wherein the signal is filtered and only those frequencies or that frequency relating to the frequency of the crystal of timepiece 1 is passed through via line 10 to amplifier 5. Amplifier 5 feeds the resulting signal via line 11 to counter 6 whereat the frequency of the timepiece is determined in a final step which is known per se.

Figure 2:
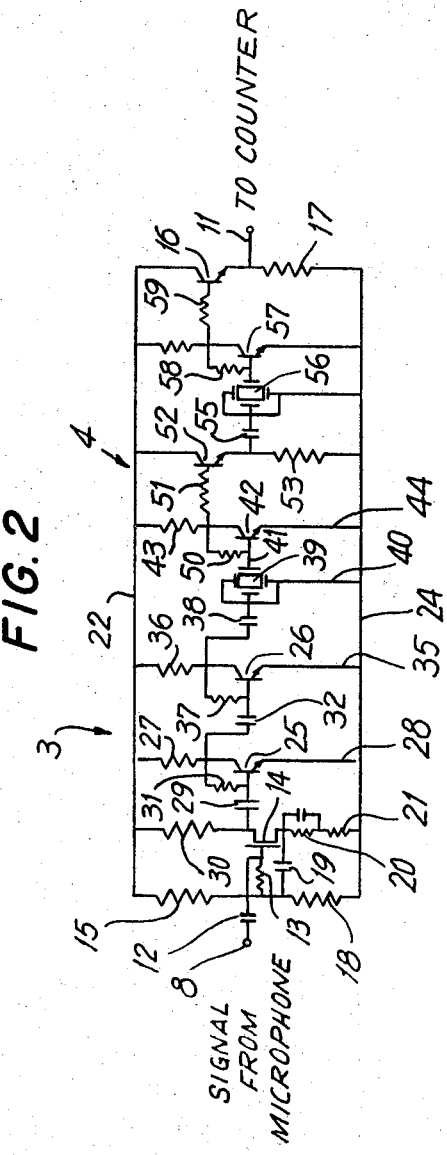
FIG. 2 is a schematic diagram of an electronic circuit employed in the block diagram of FIG. 1.

FIG. 2 illustrates the circuit which is employed between lines 8 and 11 and it is seen, for example, that this circuit includes the pre-amplifier 3 as well as the crystal filter 4. More particularly, line 8 is coupled to the amplifier 3 via a capacitor 12 which is connected between a resistor 13 and field effect transistor 14, the resistor 13 being connected via a resistor 15 to a transistor 16, which is connected to line 11 and via resistor 17 to a resistor 18 which is coupled to the above mentioned resistor 13.

The junction of resistors 15 and 18 is connected via a capacitor 19 to a resistor and capacitor combination 20 and thence via resistor 21 to resistor 17.

The above noted circuits include two common lines 22 and 24 between which are connected transistors 25 and 26. Transistor 25 is connected to line 22 via resistor 27, and to line 24 via line 28. The transistor 25 is furthermore coupled via capacitor 29 to element 14, the capacitor and said element being connected via resistor 30 to line 22.

The base of transistor 25 is connected via resistor 31 and capacitor 32 to the base of transistor 26, whose emitter is connected via line 35 to line 24 and whose collector is connected via resistor 36 to line 22. The base of transistor 26 is connected via resistor 37 and capacitor 38 to quartz crystal 39 which is connected via line 40 to line 24 and via line 41 to the base of a transistor 42 whose collector is connected via resistor 43 to line 22 and whose emitter is connected via line 44 to line 24.

The base of transistor 42 is connected via resistors 50 and 51 to the base of transistor 52 which is connected via transistor 53 to line 24 and via capacitor 55 to quartz crystal 56 which is connected in turn to transistor 57 and via resistors 58 and 59 to the base of transistor 16.

The above mentioned circuit constitutes a preamplifier for amplifying and selecting the frequency which is passed through to the crystal filter, including crystals 39 and 56 which function as aforementioned to limit the signal passed through to the frequency generated by the quartz crystal within the timepiece 1.

According to the invention, the aforementioned apparatus and circuitry function in such a sense that in connection with an electronic timepiece which includes a time standard and/or a vibrator, a measurement is made of the mechanical or acoustic vibration which is leaked from the crystal of the timepiece and transmitted from the time standard or supporting parts of the vibrator into the casing of the timepiece.

The microphone which constitutes a transducer is attached to the casing of the timepiece and the electronic circuit selects and amplifies the vibration which leaks from the time standard so that a signal may be presented to a counter which measures the accuracy of the timepiece.

There will now be obvious to those skilled in the art many modifications and variations of the structure and method set forth hereinabove. These modifications and variations will not depart from the scope of the invention if defined by the following claims.

What is claimed is:

1. Apparatus for use with a timepiece including a casing in which a support supports a quartz crystal which vibrates in sine-wave manner at least proximate a fixed frequency; said apparatus comprising transducer means to pick up low magnitude, high frequency sine-wave sound produced directly by said support and corresponding to the vibrations of said crystal and to convert the same in entirety into a sine-wave electrical signal of corresponding frequency, electronic circuit means coupled to said transducer means to measure said frequency, said circuit means including preamplifier means coupled to said microphone, filter means coupled to said pre-amplifier means for filtering through only those frequencies at least substantially corresponding with those of said quartz crystal, and amplifier means coupled to said filter means, and indicating means coupled continuously to said amplifier means.

2. Apparatus as claimed in claim 1 wherein the transducer means is a microphone.

* * * * *